(12) United States Patent
Hartig et al.

(10) Patent No.: US 8,706,772 B2
(45) Date of Patent: Apr. 22, 2014

(54) STRICT TENANT ISOLATION IN MULTI-TENANT ENABLED SYSTEMS

(75) Inventors: Martin Hartig, Speyer (DE); Bjoern Mielenhausen, Plankstadt (DE); Helmut Prestel, Bad Schoenborn (DE); Peter Eberlein, Malsch (DE)

(73) Assignee: SAP AG, Walldorf (DE)

( * ) Notice: Subject to any disclaimer, the term of this patent is extended or adjusted under 35 U.S.C. 154(b) by 252 days.

(21) Appl. No.: 12/982,299

(22) Filed: Dec. 30, 2010

(65) Prior Publication Data

US 2012/0173581 A1    Jul. 5, 2012

(51) Int. Cl.
G06F 17/30    (2006.01)

(52) U.S. Cl.
USPC ........... 707/803; 707/769; 707/791; 707/802; 707/809; 707/810; 707/811; 707/812; 726/25; 715/234; 715/765; 370/395.53

(58) Field of Classification Search
USPC ................ 707/769, 791, 802, 803, 809–812, 707/999.101; 726/25; 715/234, 765; 370/395.53
See application file for complete search history.

(56) References Cited

U.S. PATENT DOCUMENTS

2010/0058170 A1* 3/2010 Demant et al. ............... 715/234
2011/0110377 A1* 5/2011 Alkhatib et al. ......... 370/395.53
2011/0219050 A1* 9/2011 Ly et al. ....................... 707/827
2011/0246504 A1* 10/2011 Slater et al. ................... 707/769
2012/0042383 A1* 2/2012 Greene et al. ................... 726/25

* cited by examiner

Primary Examiner — Syling Yen
(74) Attorney, Agent, or Firm — Mintz Levin Cohn Ferris Glovsky and Popeo, P.C.

(57) ABSTRACT

A plurality of partitions can be defined in a database for a multi-tenant computing system provided on one or more processors such that each partition of the plurality of partitions is associated with only one business tenant of a set of business tenants supported by the multi-tenant system. The database can stored shared content that is shared among and accessible to all tenants of the multi-tenant computing system while tenant content for each business tenant can be stored in the database in one partition of the plurality of partitions. The one partition can be assigned to an associated business tenant. At least a portion of the tenant content can be unique to and associated with the associated business tenant. One or more errors can be generated to prevent tenant content associated with a first business tenant of the set of business tenants from being accessed by a second business tenant of the set of business tenants when an application code executed within the multi-tenant computing system comprises a construct that would otherwise enable cross-tenant access by the second business tenant to tenant content associated with the first business tenant. Related systems, methods, and computer program products are described.

20 Claims, 9 Drawing Sheets

| Delivery class | Client dependency | Import behavior deliveries | Content type [Shared content, system content, tenant content] |
|---|---|---|---|
| A – application table | ☐ | No delivery | Application data implies tenant content. As tenant content is to be stored in client dependent tables, this kind of modeling is contradictory. So, the usage of this classification is not recommended. |
| | ☑ | | This content can clearly be regarded as Tenant content |
| L – table for temporary data | ☐ | No delivery | This classification matches to System content |
| | ☑ | | Principally class 'L' indicates system content. But in case of client dependency, this can also be Tenant content |
| C – customizing data | ☐ | Content replaced | System content, i.e. for settings on system level, valid for all clients |
| | ☑ | Content replaced in client 000. In other clients content is only imported | This classification is to be used for tenant configuration data, thus it is Tenant content |
| G – customizing table, protected against upgrade | ☐ | Inserts only | The semantics of this table classification clearly violates the principles of the content separation as it becomes impossible to differentiate between shared content and tenant content. It is not recommended to use this kind of table classification in any case. |
| | ☑ | Inserts only | |
| E – control table, customer and core platform provider have different key areas | ☐ | content replaced | This table class indicates a combination of shared content and tenant content in the same table separated by key ranges. For client independent tables it is difficult to support different tenants in the same system with this layout. Namespaces would be required but are not consistently supported on this level. The usage of this combination is not recommended. |
| | ☑ | content replaced in all clients | Due to the fact that delivered content is imported into all clients, it becomes mixed with tenant specific extensions. Hence the shared content is not clearly separated any more. So, the usage of this combination is not recommended. |
| S, W – system table | ☐ | content replaced | Client dependent tables with delivery class "S" or "W" are used mainly in the context of metadata repositories and store SAP content as well as tenant content. Recommendation: Use this classification to store shared content only. |
| | ☑ | content replaced in all clients | Due to the redundancy shared content within tenant data, the usage of this classification is not recommended. |

FIG. 5

STRICT TENANT ISOLATION IN MULTI-TENANT ENABLED SYSTEMS

TECHNICAL FIELD

The subject matter described herein relates to a strict isolation of tenants of a system in a multi-tenancy landscape. More specifically, the subject matter relates to the strict isolation being achieved by forbidding cross-tenant access of the tenants.

BACKGROUND

In a multi-tenancy landscape, multiple tenants share a same runtime environment of a single multi-tenant computing system, which can in some examples be an advanced business application programming (ABAP) runtime. FIG. 1 illustrates a multi-tenancy landscape 100. In multi-tenancy landscape 100, a single instance of a software application running on a multi-tenant computing system ("multi-tenant computing system 1 (118)") serves multiple tenants 102, 104, and 106. An example of the software application is "Business ByDesign (ByD)" by SAP. The multi-tenant computing system may refer to a server hosting the software application. The tenants refer to client systems at one of client organizations that access the software application and individual clients that access the software application. Therefore, the terms tenant and client are used interchangeably in the instant specification. The tenants of the multi-tenancy landscape 100 share the same application. In the multi-tenancy landscape 100, each tenant 102, 104, and 106 works with a customized virtual application instance. Further, the multi-tenancy landscape 100 includes other one or more multi-tenant computing systems (e.g. "multi-tenant computing system 2 (120)"), where each of the other one or more multi-tenant computing systems is capable of serving one or more tenants.

Multi-tenancy allows different tenants (clients) 102, 104, and 106, to be hosted on a single, shared computing infrastructure. The hosting of multiple tenants 102, 104, and 106, all of which access a same instance of an application, on a same multi-tenant computing system 118, allows an administrator 202 (or hosting provider) to easily optimize administration and minimizes cost of hosting multiple tenants and making applications available to the multiple tenants. The cost that is minimized is a total cost of ownership (TCO) for the hosting provider like SAP. The total cost of ownership includes return on investment, rate of return, economic value added, and return on information technology.

SUMMARY

The subject matter described herein presents methods to provide solutions to the above-noted problems and fulfill the above-noted needs. The methods perform strict tenant isolation in multi-tenancy landscape 100. The strict tenant isolation is allowed by separating tenant content associated with tenants of multi-tenancy landscape 100 at multiple persistency levels including an application server level, a database level, LiveCache level, and TREX level. The tenant content is separated at the persistency levels by generating one or more errors to prevent tenant content associated with a first business tenant to be accessed by a second business tenant when an application code associated with the multi-tenant computing system comprises one or more constructs that enables cross-tenant access of tenant content associated with the first business tenant by the second business tenant. Further, when the one or more errors are generated, the application program run is aborted to prevent the cross-tenant access and a dump is generated. The dump allows an overview on the generated errors and an analysis of the one or more errors generated. A variation of the errors performed may occur during development of the software at the software provider in non-productive environment (i.e., when no real business tenant is in the system). Here, the application program run may continue (the cross-client access is not prevented) and a log is created that can be analyzed later on. This variation is used to get an overview on cross-client accesses in an application program to be prevented in a productive environment.

In one aspect, a computer implemented method includes defining a plurality of partitions in a database for a multi-tenant computing system provided on one or more processors. Each partition of the plurality of partitions is associated with only one business tenant of a set of business tenants supported by the multi-tenant system. Shared content that is shared among and accessible to all tenants of the multi-tenant computing system is stored in the database, while tenant content corresponding to each business tenant is stored in its own partition of the plurality of partitions of the database. Each own partition is assigned to an associated business tenant, and at least a portion of the tenant content is unique to and associated with the associated business tenant. One or more errors are generated to prevent tenant content associated with a first business tenant of the set of business tenants from being accessed by a second business tenant of the set of business tenants when an application code executed within the multi-tenant computing system comprises a construct that would otherwise enable cross-tenant access by the second business tenant to tenant content associated with the first business tenant.

In some exemplary variations one or more of the following can optionally be included. The second business tenant can be prevented from accessing the content associated with the first business tenant at a plurality of persistency levels. The database can further store system content that is provided by a hosting provider of the multi-tenant computing system. A set of system tenants of the tenants of the multi-tenant computing system can be designated such that each system tenant of the set of system tenants provides system services for the multi-tenant computing system using system content. To provide the system services to the computing system including the tenant content, each system client can access the content of other tenants. The shared content can be provided by a hosting provider of the multi-tenant computing system, and can be the same for all tenants of the multi-tenant computing system. The shared content can include kernel binaries, support packages, add-ons, data dictionary definitions, and metadata associated with an application. A same instance of the shared content can be accessible by tenants of the multi-tenant computing system. Application logic of the application code can be executed on the business tenants. The shared content can be modified by a system administrator, while users associated with the tenants are inhibited from modifying the shared content. The tenant content can include business configuration data, extensions, audit data and archived data associated with each business tenant. The system content can be generated by a run-time execution of an application system in the multi-tenant computing system.

Articles are also described that comprise a tangibly embodied machine-readable medium operable to cause one or more machines (e.g., computers, etc.) to result in operations described herein. Similarly, computer systems are also described that may include a processor and a memory coupled to the processor. The memory may include one or more programs that cause the processor to perform one or more of the operations described herein.

The subject matter described herein provides many advantages. For example, any change in an application code (e.g. ABAP code) cannot allow cross-tenant access as constructs that can possibly allow cross-tenant access are forbidden. Therefore, irrespective of any changes in the code, cross-tenant access is forbidden and thus, tenant isolation is maintained.

The details of one or more variations of the subject matter described herein are set forth in the accompanying drawings and the description below. The variations are described herein by way of example. Other features and advantages of the subject matte described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 5 is a table showing examples of delivery classes that are associated with corresponding content types;

When practical, similar reference numbers denote similar structures, features, or elements.

DETAILED DESCRIPTION

Figure 1:
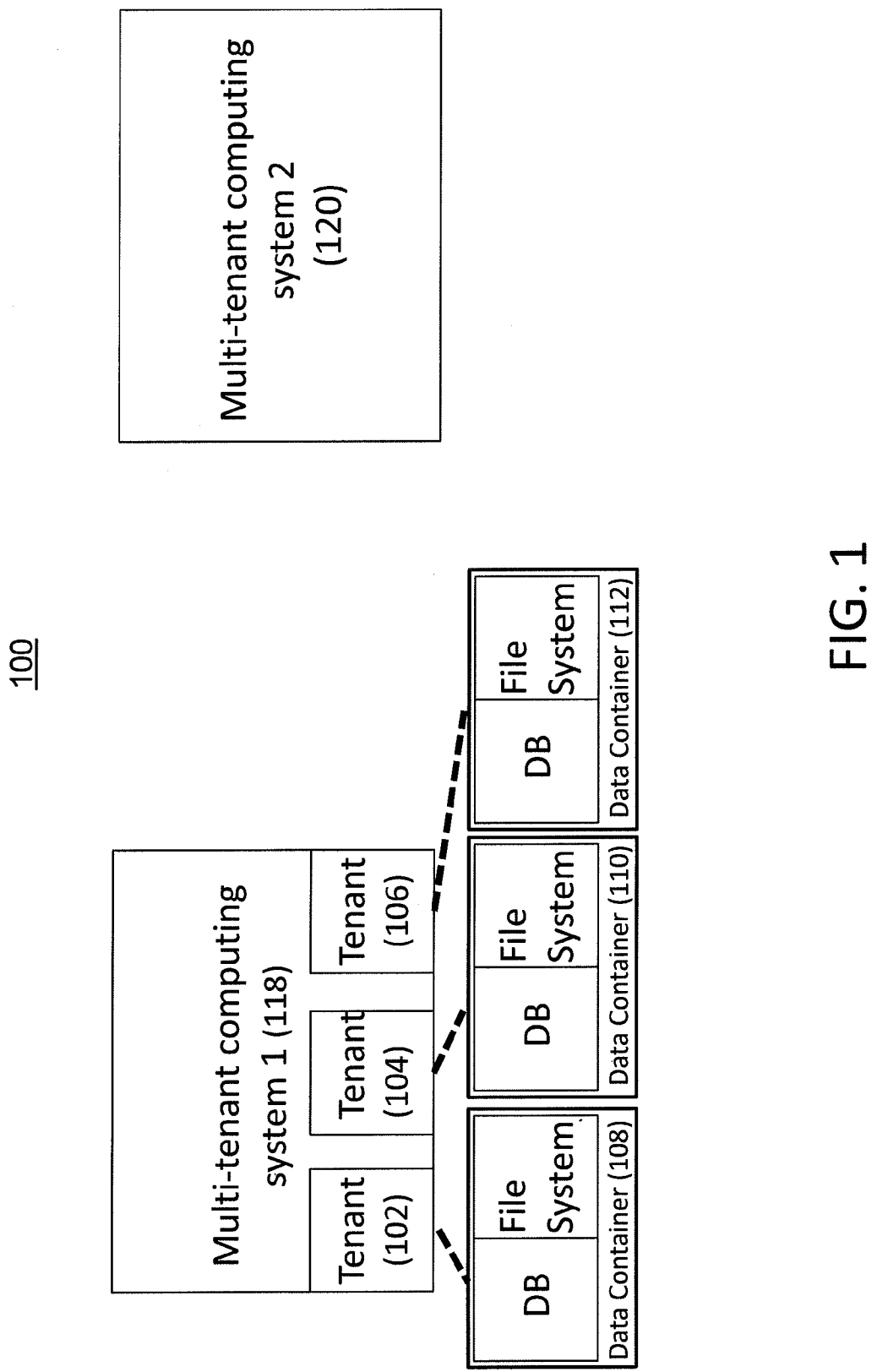
FIG. 1 illustrates a multi-tenancy landscape.

Conventionally, a multi-tenancy landscape 100 is not known as a platform for providing software as a service (SaaS) to the tenants of multi-tenancy landscape 100. SaaS is defined as software that is owned, delivered and managed remotely by one or more providers. The one or more providers deliver an application based on a single set of common code and data definitions, which are consumed in a one-to-many model by all contracted customers (tenants in the example of the multi-tenancy landscape 100 shown in FIG. 1) at anytime and on a pay-for-use basis or as a subscription based usage metrics. The reason why a multi-tenancy landscape is not known to provide SaaS to the tenants is because content associated with different tenants of multi-tenancy landscape 100 has not been entirely separable conventionally. Accordingly, there is a need to isolate the tenants by separating their content and not allowing cross-tenant access such that SaaS can be implemented in a multi-tenancy landscape 100.

The terms "data" and "content" have been used interchangeably in the instant specification.

In a multi-tenancy landscape 100, there exists a need to simultaneously fulfill the following two requirements.

The first requirement imposes strict content isolation between tenants on all levels of the multi-tenant computing system on which the tenants are implemented. The content (and tenant-specific application extensions) associated with the tenant should not mingle with content (and tenant-specific application extensions) associated with other systems implemented on the same multi-tenant computing system that implemented the tenant. Furthermore, content associated with one business tenant should not be accessible via an application program run by another business tenant. The first requirement ensures a direct benefit of application tenants, which are tenants (business tenants) that are assigned to customers and that hold business application content of the customers.

The second requirement imposes that costs (or total cost of ownership for a hosting provider like SAP) for operating multiple tenants in the same system must be significantly lower than costs for operating single-tenant systems that each hosts a single tenant, as in single-tenancy landscapes, as opposed to multi-tenancy landscapes. The second principle ensures a direct benefit of administration tenants or system tenants that are not associated with any business application content and that can be accessed by only hosting providers (e.g. multi-tenant computing system administrator 202) and not by customers accessing a same instance of an application.

To some extent, the first requirement and the second requirement are contradictory, as follows. The first requirement, which imposes separation of tenant content, can naturally be fulfilled by single tenancy landscapes that have systems implementing just one tenant per system as opposed to a multi-tenancy landscape 100 where each system implements multiple tenants. On the other hand, the second requirement, which imposes a need for sharing resources on each level (hardware, database, application server etc.) of a multi-tenant computing system, can be fulfilled by multi-tenancy landscape 100 where resources may be shared between the tenants on a multi-tenant computing system.

However, the first requirement and the second requirement need to be simultaneously fulfilled by a multi-tenancy landscape 100 rather than the first requirement being fulfilled only by a single-tenancy landscape. Therefore, multi-tenancy needs to achieve a sharing, by multiple tenants, of as much system-resources as possible while isolating the tenant content associated with a particular tenant from tenant content associated with other tenants implemented on a same system. There is a need in a multi-tenancy landscape 100 to achieve separation of content associated with different tenants on a multi-tenant computing system such that a SaaS enabled infrastructure can be provided for the application whose same instance is being accessed by different tenants.

To address the noted issues and potentially other issues with currently available solutions, one or more implementations of the current subject matter provide methods, systems, articles or manufacture, and the like that can, among other possible advantages, provide a strict isolation of tenant content associated with a tenant from tenant content associated with other tenants implemented on a same system in multi-tenancy landscape 100.

The instant specification also describes a classification of the entire content in a multi-tenancy landscape 100 as one of shared content (e.g. shared SAP content), tenant content and system content. The problem of inseparability of content associated with the different tenants is solved by introducing a new tenant isolation concept into an ABAP virtual machine (VM). As will be noted later, the new tenant isolation concept forbids cross-tenant access for a first set of tenants but allows cross-tenant access for a second set of tenants.

From an architectural perspective, there is a clear separation between kernel components (ABAP VM, Server infrastructure, all written in C and natively executed) and ABAP components (tools, frameworks, libraries, all written in ABAP and interpreted by the ABAP VM). Both components are strictly isolated. Any ABAP code cannot change the runtime behavior of the ABAP virtual machine. Therefore, the tenant isolation, which is implemented by the ABAP runtime, has the advantage that the tenant isolation cannot be changed by any ABAP code. Thus, even accidental or intentional misuse of the ABAP code cannot affect the isolation of tenant content.

Figure 2:
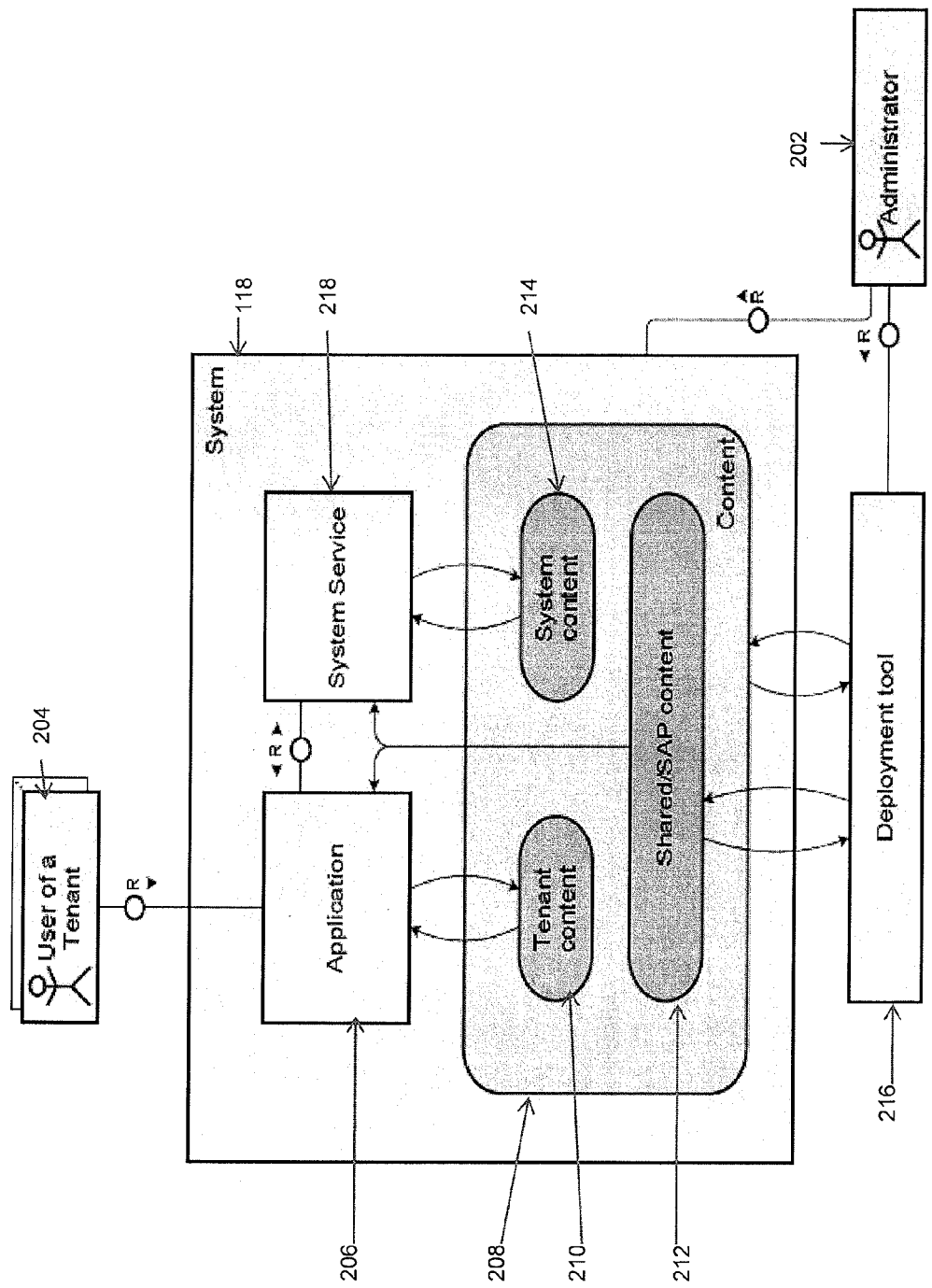
FIG. 2 illustrates a classification of content as tenant content, system content and shared content, and illustrates accesses of the tenant content, the system content and the shared content.

The content in a multi-tenancy landscape 100 can be classified as one of shared content (also known as shared core softeare platform content), tenant content, or system content. FIG. 2 illustrates content 208 in a multi-tenancy landscape 100. Content 208 is classified as one of (1) shared content 212, (2) tenant content 210 and (3) system content 214, which are described below. Further, FIG. 2 illustrates that application 206 has a read access and a write access to tenant content 210, system service 218 has a read access and a write access to system content 214, and administrator 202 has a read access and a write access to shared SAP content 212 via deployment tool 216.

Shared content 212 is content provided by a hosting provider that provides a software application 206, a same instance of which is accessed by different tenants. As noted earlier, the shared content 212 is the same for all the tenants using software application 206. Generally, shared content 212 includes hosting provider deliverables including binaries, installation packages, support-packages, and add-ons (including the add-ons created by partners of the hosting provider) associated with software application 206. Shared content 212 cannot be modified by a tenant of multi-tenancy landscape 100 or customer/user 204 of the tenant. Software change management onto shared content 212 cannot be performed by a customer or a tenant, but can be performed by system administrator 202 of the hosting provider. Examples of shared content 212 are kernel binaries, source code for the application (e.g. ABAP source code for a SAP application), data dictionary (DDIC) definitions, entire metadata associated with the software application, and templates to support scoping. ABAP and DDIC are defined as follows.

ABAP is an application-specific fourth-generation language that is used for programming SAP application server. All ABAP programs reside inside the SAP database. The ABAP programs for an application are not stored in separate external files like Java or C++ programs.

The data dictionary (DDIC) is an ABAP Dictionary. The data dictionary contains all metadata about the content in the multi-tenant computing system. The data dictionary centrally describes and manages all content definitions used in the system.

Tenant content 210 includes business content (master data, transaction data) associated with a tenant. The business content includes business configuration, extensions, audit data as well as archived data. Tenant content 210 refers to content specific to a tenant in an application 206.

System content 214 is content created by a run-time execution of a system by system service 218. Thus, it is to be noted that system content 214 is not shared content 212 provided by the hosting provider (e.g. SAP). Therefore, neither customer 204 nor system administrator 202 can make changes to system content 214. System content 214 is not subject to SAP Lifecycle Management. Although the content is not subject to SAP lifecycle, tables covering system content 214 are covered by the SAP Lifecycle Management, the tables being covered for the structure definition and adoption of existing content to a new structure (e.g. EXecution of PRogram After Import (XPRA) programs). Examples of system content 214 include programming language (e.g. ABAP) load, RFC/hypertext transfer protocol (HTTP) destinations, spool requests comprising content that is to be printed and how this content should be printed, and batch jobs.

Figure 3:
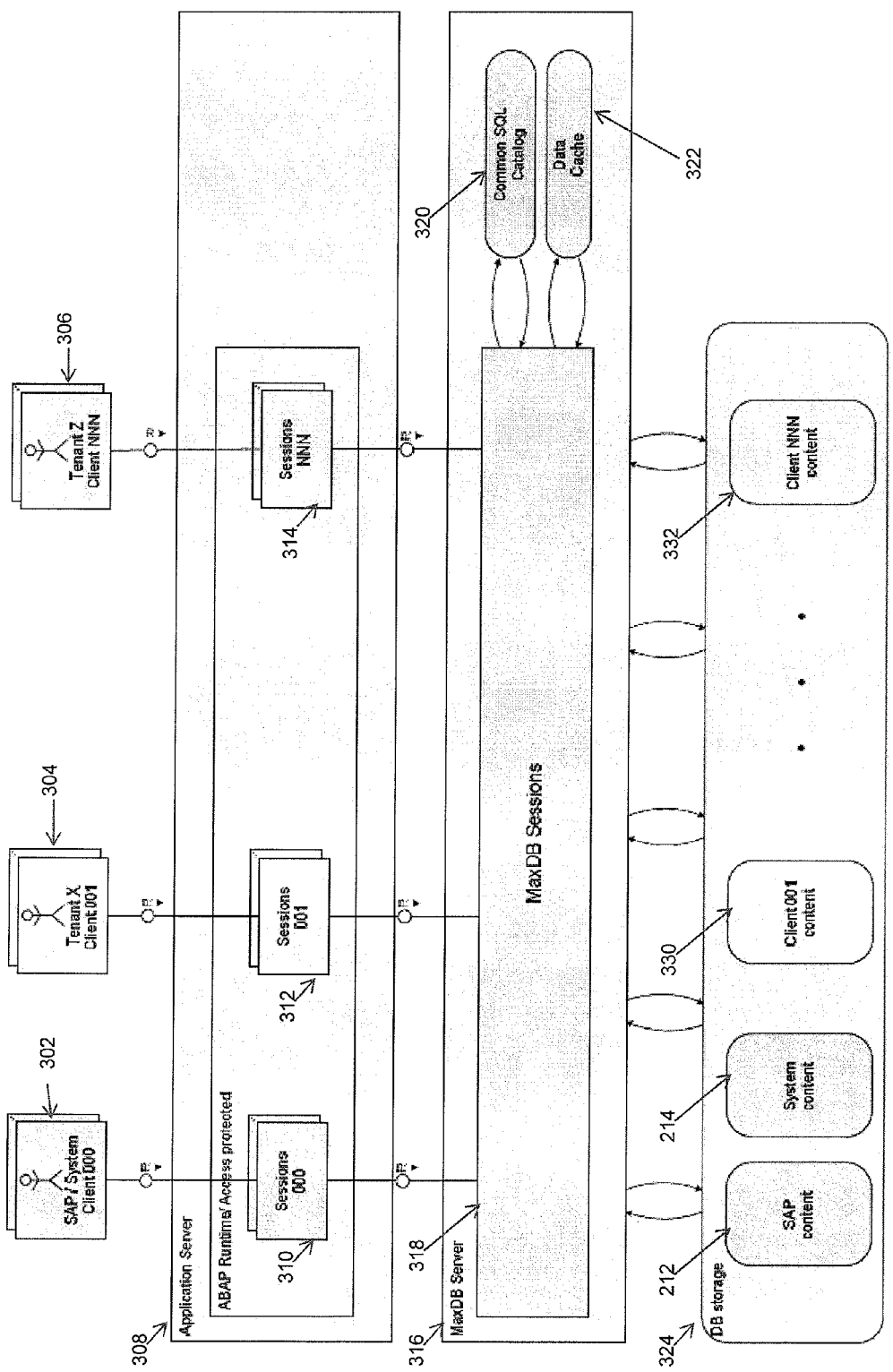
FIG. 3 illustrates isolation of tenant content in different persistence layers including application server, a relational database management system server, live cache and database.

In a multi-tenant system, there is one shared content 212 for all the tenants and one system content 214 for all the tenants. On the other hand, separate tenant content exists per tenant rather than same tenant content being common for all the tenants. FIG. 3 illustrates that both shared content 212 and system content 214 are common for all the tenants of multi-tenancy landscape 100, but tenant content is specific and separate for each tenant. Database storage 324 includes a common shared content 212, a common system content 214, and separate tenant content 330 . . . 332 for each tenant of multi-tenancy landscape 100.

FIG. 3 further illustrates the content associated with each tenant passing through the persistence levels including: an application server level 308, a relational database management system (RDBMS) level (e.g. MaxDB available from SAP AG), a live cache level for managing complex object (e.g. MaxDB LiveCache available from Sap AG), a TREX level, and a database level 324. To maintain tenant isolation, tenant content needs to be separated at all these persistence layers. The separation of content at these persistence layers is described later in the instant specification.

To enable clear content separation of tenant content, a tenant classification and new database functions are introduced.

The tenant classification classifies a tenant as one of a business tenant and an administration tenant. The business tenant is a tenant in which application logic is executed, the application logic being of the application whose single instance is accessed by different tenants of a multi-tenancy system. The business tenants include business content of a tenant. The business content includes master data and transaction data associated with the tenant. For example, the business content may include business configuration, extensions, audit data as well as archived data. On the other hand, the administration tenants (system tenants) provide system services. An administration tenant is also known as a system tenant or a technical tenant. The business tenants are strictly isolated by forbidding, as will be explained later, cross-tenant access for the business tenants while the administration/system tenants are not isolated as cross-tenant access is allowed for the administration/system tenants.

Figure 4A:
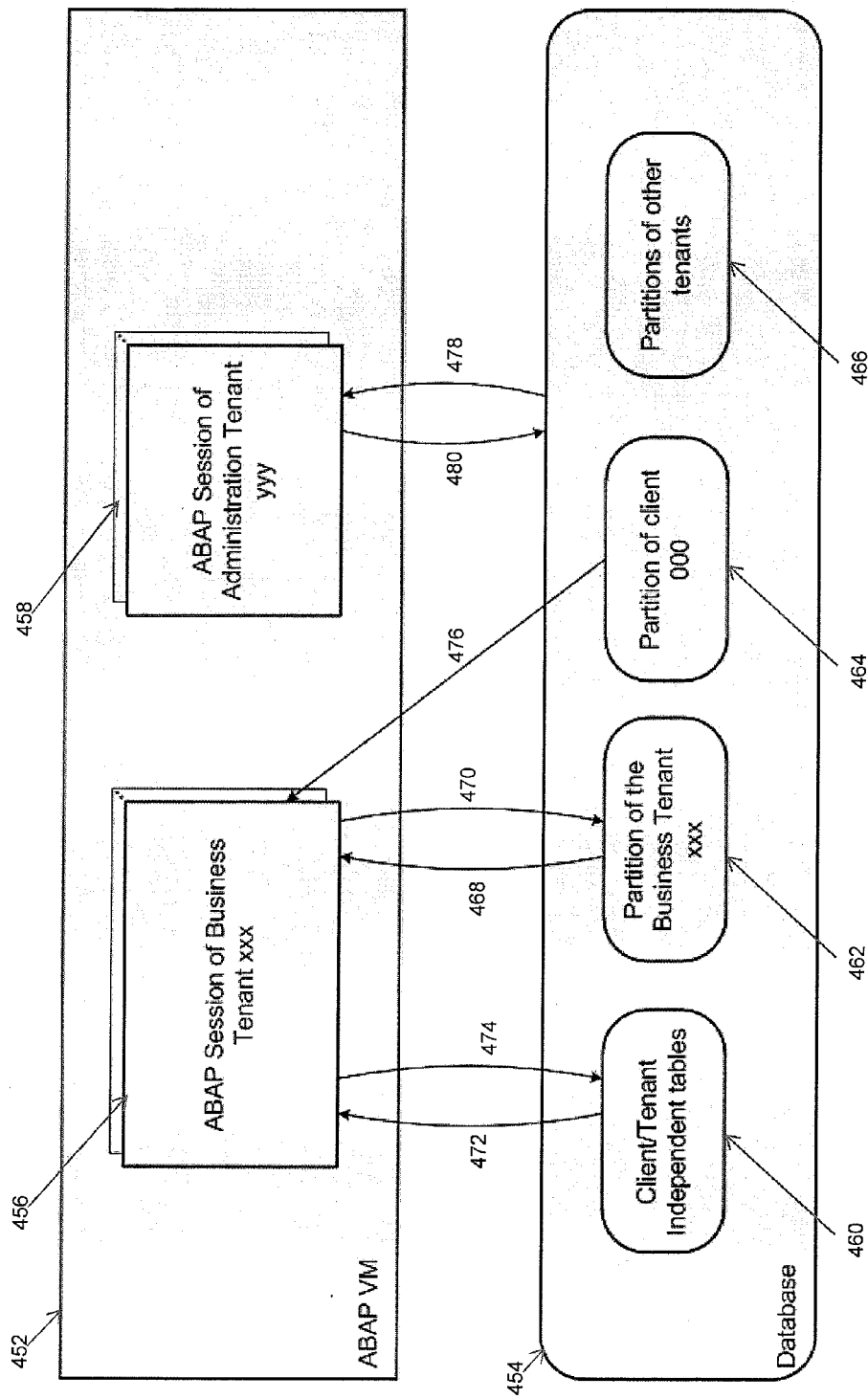
FIG. 4A illustrates the accesses of the tenant content, the system content and the shared content.

FIG. 4A illustrates ABAP sessions of business tenants 456 and an ABAP session of administration tenants 458 in ABAP virtual machine 452. As will be noted later with respect to content separation at database level, partitions of a table in database 454 are made. Each business tenant is associated with a separate partition. The tenant data for each business tenant is stored in the corresponding partition. The first partition of the table is called "client 000" partition 464. The "client 000" partition 464 contains system content 214 and shared SAP content 212. The business tenants have read access 468 and write access 470 to their corresponding partitioned tenant content 462, have read access 472 and write access 474 to client-independent/tenant-independent tables 460, and have just a read access 476 of content associated with "client 000" partition 464, wherein the content associated with "client 000" partition 464 is system content 214 and shared SAP content 212. Note that a business tenant cannot access tenant data that is associated with other tenants and represented by other tenant partitions 466. On the other hand, administration/system clients have read access 478 and write access 480 to entire content of database 454, wherein the entire content of the database 454 includes client independent tables 460, partition associated with the business tenant 462, partition associated with other business tenants 466, and partition associated with "client 000" 464.

Figure 4B:
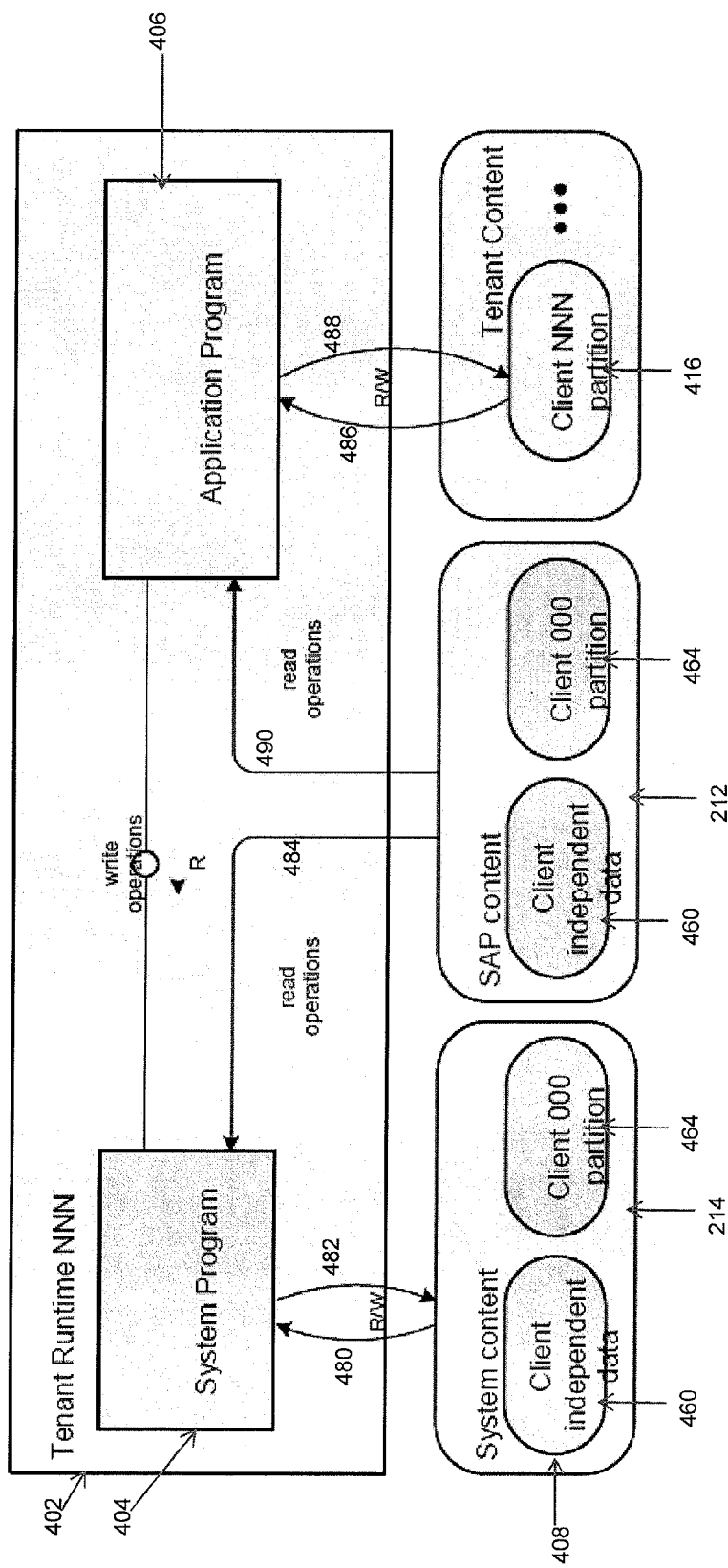
FIG. 4B illustrates another representation of the accesses of the tenant content, the system content and the shared content.

FIG. 4B illustrates another representation of data access (read access and/or write access) associated with system content 214, shared content 212 and tenant content. System content 214 is contained in client independent data 460 and "client 000" partition 464, both of which are comprised in database 454. Shared content 212 is also contained in client data 460 and "client 000" partition 464. Tenant content associated with each business tenant is contained in a corresponding client partition 416. FIG. 4B further illustrates a runtime of a tenant that is implemented on a system and that is accessing an instance of an application. The system is associated with system program 404 and the application is associated with an application program 406. The system program 404 has read access 480 and write access 482 to system content 214, and has read access 484 to shared content 212. Application program 406 has a read access 486 and write access 488 to the corresponding client partition 416, and has read access 490 to shared SAP content 212.

In an exemplary implementation, the ABAP class CL_SYSTEM_CLIENT_CHECK provides methods to (1) check whether the current tenant is configured as a system (administration) tenant, and (2) assert that code of the class CL_SYSTEM_CLIENT_CHECK is only executed in a system (administration) tenant.

Database functions can be provided to transform the logical content separation on a table level into a physical content separation with separate disk volumes per tenant. These database functions allow attach/detach operations for tenant content during a tenant move from a source multi-tenant computing system to a target multi-tenant computing system and significantly reduce tenant downtime during the tenant move. During a tenant move, the detach operation detaches tenant content from the source system, and the attach operation attaches the detached tenant content to the target system.

Shared content 212 can be extended with tenant extensions. However, some client-dependent tables (e.g. client-dependent tables of class "E" that are control tables) may contain content that is owned together by two or more tenants. Client dependent tables will contain content owned together by two or more tenants when the client associated with a particular client dependent table comprises of the two or more tenants. The joint ownership of the content can complicate both separating tenant content associated with corresponding tenants and separating shared content 212 from tenant content. To address the problem of inseparability of content, the instant implementation implements, at the persistence levels, following changes to the data dictionary (e.g. ABAP data dictionary), table buffer, and runtime, such that a logical content separation is supported.

In contrast to conventional multi-tenancy landscapes, the following changes are incorporated at application server level 308 to ensure separation of the tenant content. TABLE 1 illustrates a delivery class classification that describes the content type (e.g. shared content 212, system content 214 and tenant content 210) that will be stored in a particular database table.

According to an exemplary implementation shown in the table 500 shown in FIG. 5, delivery class A corresponds to content included in an application table, delivery class B corresponds to content included in a table for temporary data, delivery class C corresponds to customizing data, delivery class G corresponds to content included in a customizing table that is protected against an upgrade by the hosting provider, delivery class E corresponds to content included in a control table where a customer and the hosting provider have different key areas, and delivery classes S and W correspond to content included in a system table. More specifically, the table 500 gives an overview of different delivery classes that are associated, depending on client dependency attribute, with a corresponding content type. The corresponding content type is shared content 212, system content 214 and tenant content 210.

At runtime, an access control ensures that (1) business tenants cannot read or modify content associated with another tenant at any time (e.g. a tenant can only read, write, or otherwise modify its own tenant content at runtime, but not that of other tenants), and (2) tenants cannot modify shared content 212 since the shared content 212 is provided by the hosting provider and is under a control of hosting provider administrator 202 (e.g. administrator). Therefore, at application server level 308, tenant content associated with each tenant is protected from tenant content associated with other tenants.

The above-noted tenant content separation at application server level is achieved by making tables in the data dictionary to be tenant-dependent. In an exemplary implementation, the tables in the data dictionary are made tenant dependent by specifying the first field of the primary key to be tenant-specific e.g. specifying the first field to be of data dictionary type CLNT.

Content separation can be provided by implementations of the current subject matter. At the database level 324, four different approaches can be used to realize a tenant separation. In a first approach, each tenant has its own table partition, and each tenant is identified by a identifier of the corresponding table partition. Most database platforms offer a horizontal table partitioning feature where the database optimizes content access according to the partitioning information and offers special lifecycle management operations on the partition level. The special lifecycle management operations can include attach and detach of tenant content during a tenant move from a source system to a target system. In an exemplary implementation, with using a RDBMS such as SAP AG's MaxDB, a table partitioning that fits closely to the ABAP client concept is introduced. This approach is realized in a preferred embodiment. Other embodiments may apply the alternate approached described below.

In a second approach, each tenant has its own database, and each tenant is identified by an identifier of the corresponding database. In a third approach, each tenant has its own database schema, and each tenant is identified by a name of the corresponding database scheme. In a fourth approach, each tenant has its own set of tables, and each tenant is identified by a table namespace of the corresponding set of tables.

Content separation can also be provided at a live cache level 322, which supports multi-tenancy. Each tenant has its own live cache schema (or plan version), which leads to a logical separation between tenants.

According to an exemplary implementation, tenants associated with a multi-tenant software architecture can be provided via a RDBMS (e.g. MaxDB from SAP AG) and live cache complex object management system (e.g. LiveCache from SP AG) in a single database instance (e.g. a "OneDB" configuration available from SAP AG). As a consequence, RDBMS content and live cache content can be stored in a same tenant volume. Therefore, a tenant move that uses detach of tenant content from a source system and subsequent attach of the detached tenant content to a target system takes into account movement of RDBMS content and live cache content from the source system to the target system.

In some implementations, content separation can also be provided at the TREX level. TREX is a search engine in the SAP NetWeaver integrated technology platform produced by SAP AG. TREX stands for Text Retrieval and information EXtraction. TREX supports various kinds of text search, including exact search, boolean search, wildcard search, linguistic search (grammatical variants are normalized for the index search) and fuzzy search (input strings that differ by a few letters from an index term are normalized for the index search). The content associated with the TREX search engine is stored in a TREX persistence layer that includes physical TREX indexes described below.

The features described below realize the physical separation of tenant content within TREX.

Physical TREX indexes are stored as files in the file system. In the instant implementation, separate indexes are defined for each tenant. The separate indexes use TREX namespace, which separates the tenant content associated with different tenants.

By having separate indices for each tenant, the number of files increases proportionally with the number of tenants in a system. This increase may result in a very large number of files. Therefore, the feasibility of having the increased number of files is checked at the file system level and storage system level. The increased number of TREX files can be reduced by consolidating content that has been spread across multiple files in earlier implementations into one TREX file, up to a reasonable level. As an example, in SAP ByDesign all TREX index data referring to a Business Object Node may be stored in one TREX file. Here, a Business Object denotes a model of a business entity (e.g. a sales order), and a Business Object Node denotes a part of the Business Object (e.g. an item of a sales order). It is to be noted that although the TREX content being made tenant-specific may increase the number of files, the increase in the number of files is within memory limit, as ensure by optimization described later and verified by the feasibility check, while achieving the advantage of isolation of the tenant data and the tenants.

If a tenant is moved from a source system to a target system, the tenant-specific TREX content is also a part of the tenant move. i.e. the tenant-specific TREX content is also moved along with the tenant from the source system to the target system.

To prevent the increased number of files from reaching the memory limit, the tenant-specific TREX content is optimized by performing optimizations to handle the TREX metadata. Thus, the optimizations avoid significant memory increase.

Further, it is to be noted that there is a transactional coupling between TREX and a RDBMS such as MaxDB by which the TREX content is kept consistent with RDBMS content. The transactional coupling ensures that during a tenant move from a source system to a target system, the TREX content and the RDBMS content that are associated with the moving tenant move jointly with the tenant from the source system to the tenant system. The transactional coupling requires a one-to-one coupling between RDBMS server and one TREX server when there is one TREX server per ABAP application server. In case multiple TREX servers (instead of one TREX server) are configured, the transactional coupling must be adapted to support this set up. Furthermore, the existing approach has bandwidth limitations, which requires a more efficient coupling.

Content in the file system level is considered to be system content 214 only. No tenant content is included at the file system level. Accordingly, there is no tenant content, at the file system level, that needs to be separated.

Conventionally, a repository (e.g. SAP repository) does not contain tenant-specific content, and all repository objects in the repository are global instead of being tenant-specific. To enable a repository to be tenant-enabled, at least one of the following two approaches implemented in separate embodiments are taken.

A client-independent repository can include customer-specific namespaces. Each customer is associated with a namespace corresponding to the each customer. A customer can operate one or more tenants (e.g. productive tenant, test tenant) that use the same customer namespace. The namespace being customer-specific makes transports between the test tenant and the productive tenant simpler as they do not require a renaming. Customer-specific extensions can be stored, without collisions, in the system-wide SAP repository. The advantage of this approach is that no changes to the present SAP repository are needed, thus substantially decreasing the implementation efforts.

As a drawback, however, it is not possible to host two tenants of the same customer in the same system for at least the reason that a common namespace for the two tenants cannot isolate the tenants. Namespace is the criteria for isolating the tenants, but in this case, the two tenants have the same namespace. Similar problems that do not allow isolation of tenants arise if extensions of partners of the hosting provider are transported into the system. The visibility of the partner extensions is system-wide and the partner extensions can be operated by all tenants. The provisioning of the partner extensions is a decision of the hosting provider for each system. In case of a tenant move from a source system to a target system, all required partner extensions must also be provided at the target system. As an alternative, the partner extensions (outside the SAP Delivery) can be transported into the customer namespace and become customer extensions. However, the use of customer extensions adds complexity to the Lifecycle Management of the partner solution by requiring a resolution of potential name clashes. The potential name clashes may be caused when different tenants may be associated with the same namespace, thus not allowing the isolation of tenants.

A second approach, which can provide advantages relative to the use of customer extensions but with higher associated costs, the repository can be made tenant-enabled. i.e. each tenant can be associated with a separate tenant extension. Thus, the repository includes tenant extensions instead of just customer extensions. The multi-tenant capability isolates the tenant extensions and separates them from shared content 212. This allows operating of several tenants with the same customer namespace in the same system. Each tenant can also incorporate, without interfering with other tenants, extensions of partners with their associated namespaces.

A client-dependent repository allows a tenant move from a source system to a target system to be fast with minimal tenant downtime and to be simple with no need of providing the partner extensions at the target system, as noted in case of a client-independent repository with customer-specific namespaces. Not only the tenant content but also the tenant extensions of the repository and all the partner extensions used by this tenant are logically and physically separated and are subject to the tenant move.

In order to ensure tenant content isolation as well as tenant isolation, static code-based checks as well as runtime checks are performed to verify strict tenant isolation. The programming codes are checked statically, that is when the program codes are created, and also dynamically, that is when the program codes are running. It is to be noted that the checks need to be applied to business tenants and not to administration tenants (system tenants). Thus, all business tenants that correspond to customers are isolated, whereas cross-tenant access is allowed in administration/system tenants that correspond to a system administrator 202.

In static code based checks for content separation, the code for the application is checked for the presence of endangering programming language (e.g. ABAP) constructs in the code. When the endangering programming language construct is a part of the code, a violation is caused and an error or warning is generated. For example, the general ABAP Quality infrastructure tool "Checkman" is enriched with code based checks which claim errors or warnings when using endangering ABAP language constructs. The endangering constructs promote a cross-tenant (cross-client) access that is to be avoided to achieve tenant isolation. Therefore, the provision of cross-client access by the endangering constructs can endanger the isolation of tenants, and thus the cross-client access needs to be forbidden. Forbidding the cross-client access can be achieved by forbidding (both in static code before runtime and during runtime) the endangering constructs that are conventionally used for cross-client access.

To forbid the cross-tenant access and perform other functions to enable tenant isolation, one or more of following checks are implemented on the code for business tenants.

(1) Check usage of "CLIENT SPECIFIED" addition in OpenSQL: The usage of CLIENT SPECIFIED is forbidden for development of an application or an infrastructure framework/software framework. The rationale for forbidding the usage of CLIENT SPECIFIED is explained below.

By default, Open SQL statements use automatic tenant handling. Statements that access tenant-dependent application tables only use the content from a current tenant. However, to use content from another tenant, other than the current tenant, the other tenant needs to be specified using CLIENT SPECIFIED. Thus, CLIENT SPECIFIED allows cross-tenant (cross-client) access of content. Accordingly, to prevent cross-tenant access, the usage of CLIENT SPECIFIED in an OpenSQL statement is forbidden, and thus checked. If CLIENT SPECIFIED is being used, a violation is caused and an, error or a warning is generated.

(2) Check database connections to log on to databases belonging to multi-tenant computing systems: A tenant makes a connection with a database by logging on to the database. Each connection is specific to the specific database that is being accessed. For a particular database, there may be default connections as well as parallel connections that are parallel to the default connections (i.e., they connect by definition to the same database as the corresponding default connection). There may be also other connections that may connect to different databases. In an exemplary implementation, multi-connect information associated with the database connections can be stored. An example of the parallel connection is a "R/3*" connection in SAP systems. To ensure tenant isolation, the following is performed.

For DBCON maintained connections, there is no behavior change, i.e. no cross-tenant access check is performed, because those connections may refer to data sources outside the multi-tenant system. For the parallel connections, the same checks as that for OpenSQL via, the default connection are applied, as described above. (3) Check usage of the ABAP statements IMPORT, EXPORT, and DELETE that have an addition "CLIENT": The usage of IMPORT, EXPORT, and DELETE with addition CLIENT statement is forbidden for application development and is forbidden in infrastructure frameworks. The rationale for forbidding the usage of the addition CLIENT is described below.

The addition CLIENT is used to specify a tenant in which content objects are stored if the import/export database table is client dependent. The addition CLIENT allows a cross-tenant (cross-client) access. The cross-tenant access needs to be forbidden, and thus a violation is caused when addition CLIENT is used with the statements IMPORT, EXPORT, or DELETE in ABAP. The violation is represented by an error or a warning.

Further, it is to be noted that the usage of administrative classes CL_ABAP_EXPIMP_* are also restricted.

(4) Check usage of Native SQL: Usage of Native SQL is forbidden in application development. This restriction of forbidding the use of Native SQL is applied to infrastructure components, especially database porting groups. The rationale for forbidding the usage of Native SQL is described below.

Open SQL allows access of database tables declared in the ABAP Dictionary regardless of the database platform that is being used to run a software application (e.g. SAP R/3 enterprise resource planning software) being used by the customer. On the other hand, Native SQL allows use of database-specific SQL statements in an ABAP program. Therefore, a code containing database-specific SQL statements cannot run under different database systems. As Native SQL allows to use database-specific statements with semantics not known to the application server and the ABAP VM, no cross-tenant access check can be performed for these statements, so it is possible to break tenant isolation using Native SQL. Thus, usage of Native SQL is forbidden.

(5) Check usage of ABAP Database Connectivity (ADBC): Usage of ADBC is forbidden in application development. The ADBC Application Programming Interface is similar to Java DataBase Connectivity (JDBC) Application programming Interface. The ADBC allows direct access to the default database, and remote connections to the default database, as in Native SQL. Therefore, usage of ADBC can break the tenant isolation. Thus, usage of ADBC is forbidden. The restriction to forbid the usage of ADBC is applied to infrastructure components, especially database porting groups.

(6) Check write access into system field SY-MANDT: The write access into the system field SY-MANDT is forbidden. The rationale for forbidding the write access is explained as follows.

The system field SY-MANDT is considered as read-only information. However, the system field SY_MANDT can be overwritten at runtime. Although the Open-SQL behavior regarding tenant dependent tables is not affected with the possibility of the system field SY-MANDT being overwritten, other code evaluating the system field SY-MANDT may get affected, if the system field SY-MANDT has been changed by the other code beforehand. Therefore, the write access into the system SY-MANDT is forbidden.

(7) Check usage of parameter IV_CLIENT in method attach that mediates access to shared memory objects (e.g. ABAP shared objects): ABAP shared objects can be declared as client independent or client dependent. The access to any shared object instance is mediated by the ATTACH method of the shared objects area class. For client dependency, the ATTACH method provides an optional IV_CLIENT parameter, which can allow cross-tenant access. Therefore, usage of parameter IV_CLIENT causes a violation.

An access of memory objects of other tenants represents a cross-tenant access, which needs to be forbidden to achieve and maintain tenant content isolation as well as tenant isolation. Therefore, an access to shared memory objects of other tenants is forbidden.

(8) Check access to enqueues of a different tenant: The access to enqueues of a different tenant is forbidden to prevent cross-tenant access. The rationale for forbidding the access described below.

An access of enqueues of a different tenant represents a cross-tenant access, which needs to be forbidden to achieve and maintain tenant content isolation as well as tenant isolation. Therefore, access of enqueues of a different tenant is forbidden.

(9) Check special database interface functions that provide cross-tenant access: The special database interface functions (e.g. function DB_SETGET that performs a sorted read of a table with a restart point) that provide cross-tenant access are disabled in business tenants.

As noted earlier, the cross-client access is limited to administration tenants, and forbidden for business tenants.

Runtime checks for tenant isolation can also be performed. The noted static code checks are necessary preconditions to achieve tenant isolation. In addition, all the noted static code checks are also implemented when the code is running, that is at runtime. To achieve tenant isolation even at runtime, other mechanisms described below need to be additionally applied.

At application server level, tenants are classified as business tenants and administration tenants. The administration tenants are also known as system tenants or technical tenants. The business tenants allow access of an application, hosted by a hosting provider, to customers for business requirements of the customers. The administration tenants are tenants that act as an administrator 202 to administer the application offered to business tenants. For all user sessions assigned to a business tenant, all cross-tenant accesses are forbidden to ensure strict tenant isolation. However, in administration tenants, cross-tenant access is allowed to perform operations that act on system level (comprising the tenants located in the system). Therefore, business tenants are strictly isolated whereas administration clients (system clients) permit cross-tenant access.

The distinction between the business tenants and the administration tenants (also known as system tenants) that allows a tenant to be specified as a business tenant or an administration tenant (system tenant) is performed at an application server profile parameter level.

A profile parameter (e.g. "sap/system_clients") can be associated with all the administration/system clients, which are separated by commas in a list. Another profile parameter (e.g. "sap/tenant_isolation_settings") defines the runtime behavior in a case of a cross-tenant violation (e.g. violation caused due to the use of an endangering construct like CLIENT SPECIFIED) in a business tenant.

A display of a dump and analysis of errors can be provided to an application developer. When a violation occurs at runtime in response to one of the noted checks at runtime, one of the following two actions is performed, depending on the setting of the profile parameter "sap/tenant_isolation_settings":

a) Generation of ABAP short dump: It is possible that errors are not detected statically, but occur at runtime and are detected by the runtime environment. These errors are called runtime errors. If a runtime error is not caught, the runtime environment terminates the execution of the code and generates a short dump. A short dump examines files in a filesystem, determines particular files that need to be backed up, and copies the determined files to a specified disk, tape or other storage medium. Thus, a short dump creates a record of a recorded state of the system when the system stopped working due to a violation. Therefore, it is possible to analyze the error at a later point in time.

Short dumps are divided into blocks describing different aspects of the runtime error. The short dump contains information like contents of data objects, active calls, and control structures.

b) Creation of a log entry in the runtime monitor: In non-productive environments (i.e. with no real business tenant in the system), it may be useful to collect all errors in an application run at once. Therefore, only a log is created and the application code is not stopped, so multiple errors can be logged in one run. The log may be displayed to an application developer on a runtime monitor, from which the log can be analyzed. The log provides a location in the code where the error occurred, and provides information that the application developer can use to fix the error so that the code can be executed.

Figure 6:
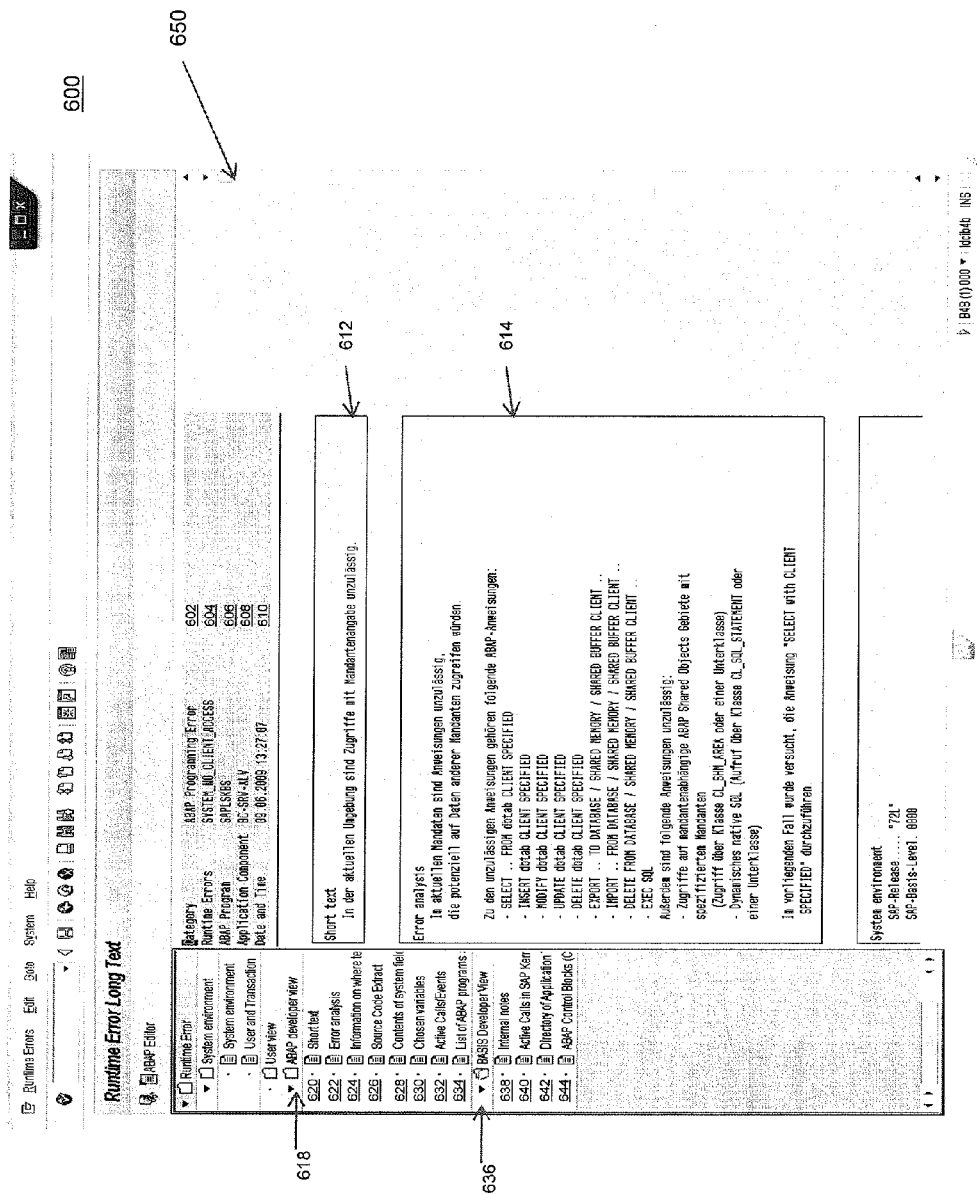
FIG. 6 is a screen shot showing a user interface that is displayed when a violation occurs and a short dump is generated.

FIG. 6 shows an example of a user a user interface 600 that is displayed on the runtime monitor when an error occurs. The user interface 600 is displayed to an application developer, and may not be confused as being displayed to a customer of multi-tenancy landscape 100.

The user interface 600 displays information that is useful for the application developer to analyze an error that causes an execution of code for the application to stop. The user interface includes a dump message that is displayed on the runtime monitor. The dump message states that the dump has been caused as the tenant needs to run in a tenant isolation mode. Further, the dump message displays a list of all the functionalities (e.g. CLIENT SPECIFIED, CLIENT, etc., as noted earlier) that are forbidden in the tenant isolation mode. Even further, the dump message provides a reference to profile parameter settings of the isolated tenants.

The user interface 600 displays category of error 602, runtime errors 604, ABAP program being used 606, application component 608, and date and time of the error 610. Further, the application developer can select ABAP developer view 618 or the BASIS developer view 636. In the ABAP developer view 618, the application developer can view short text 620, error analysis 622, source code 624, information on location of the error in the source code 626, content of system field 628, chosen variables 630, active calls/events 632, and list of ABAP programs 634. In the BASIS developer view 636, the application developer can view internal nodes 638, active calls in SAP kernel 640, directory of application 642, and ABAP control blocks 644. The user interface 600 allows an application developer to analyze the error using the error analysis 614.

Figure 7:
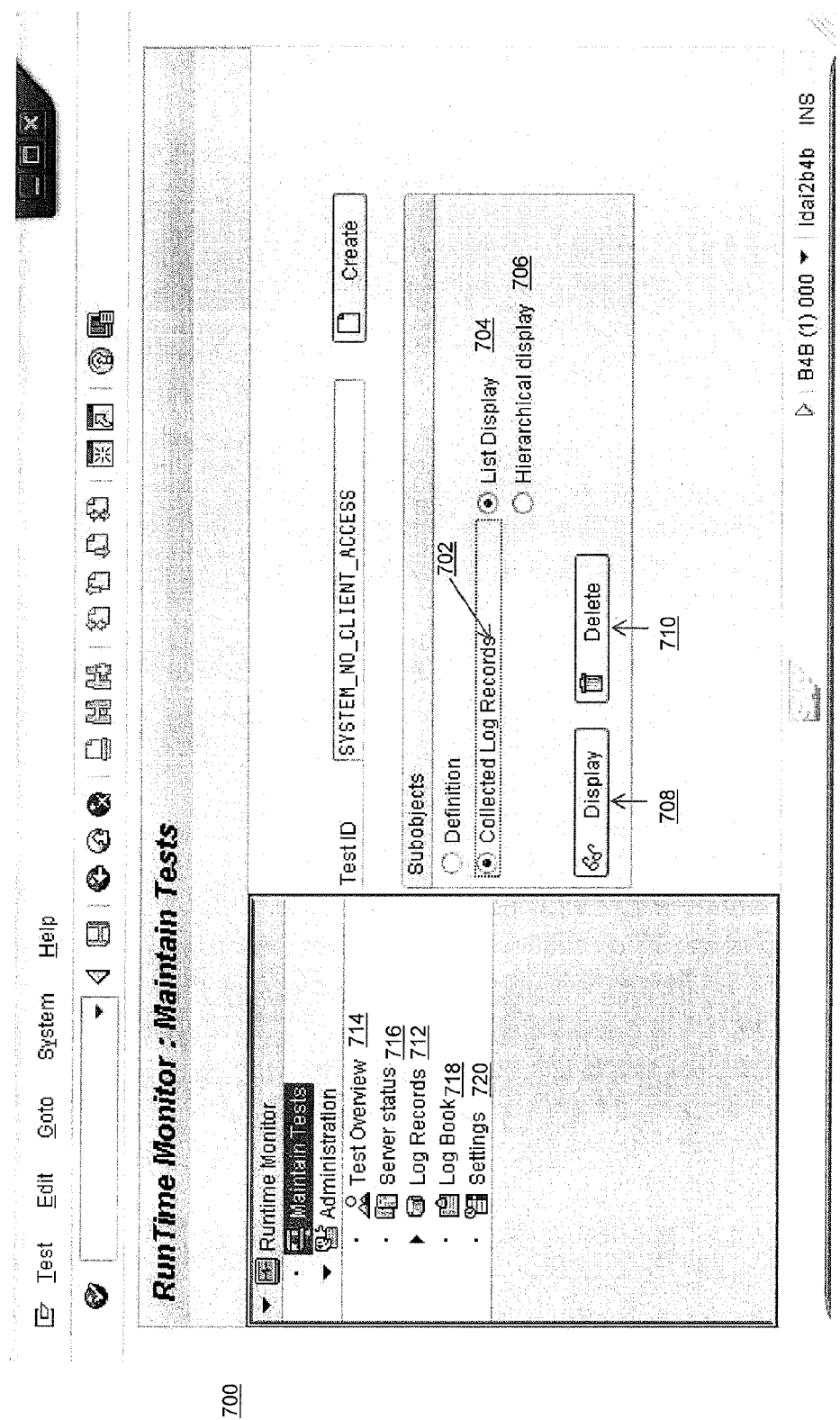
FIG. 7 is a screen shot showing a user interface that is displayed when a violation occurs and a log is created.

FIG. 7 shows an example of a user interface 700 that is used to trace tenant isolation violations and analyze them. Using user interface 700, all the log records that were collected during other violations can be viewed by selecting Log Records 712 link and then selecting the option 702 for collected log records. The view of the collected log records can be in a form of a list display 704 or hierarchical display 706. The collected log records are displayed by clicking on the Display 708 button. Some of the collected log records can be deleted by selecting the some collected records that need to be deleted, and then deleting the selected records. Besides log records 712, user interface 700 also enables an editing view of test overview 714, server status 716, log book 718, and settings 720.

Runtime checks for shared content isolation are not necessary in some implementations. The following processes are performed to modify shared content 212 (e.g. shared SAP content). During design-time, shared content is developed and therefore changed. Lifecycle management operations (e.g. detach and attach operations during a tenant move from a source system to a target system) change shared content "from outside" the system. The changed content is hard to detect from within the system. Flexibility scenarios change shared content during runtime of a system. For example, new artifacts are created in the repository comprising shared content. The new artifacts are created by using a tenant namespace to avoid conflicts. Even though shared content 212 may get modified, shared content 212 is same for all the tenants, and thus the shared content is not tenant-specific. Therefore, runtime checks that prevent cross-tenant access do not need to be performed.

Additional security measures can be provided to ensure content separation. To ensure customer content privacy, additional security measures described below are applied.

Access to the database: The system is set up in such a way that access to a database by a customer using a SAP schema is password protected. Besides the service provider that possesses the password, only the application server has access to the SAP schema and the database. Therefore, tenant runtime isolation is ensured by the application server.

Direct access to TREX servers: Similar to the database access, only the application server and the service provider have access to the TREX server. The other tenants are prevented from accessing the TREX.

TREX tenant isolation in the application server.

Tenant isolation can be switched on and off. As noted earlier, the differentiation between business tenants and administration tenants occurs at a profile parameter level. The profile parameter "abap/system_clients" is associated with administration/system tenants that allow a cross-tenant access. A wildcard ("*") can be used so that all the tenants are associated with the profile parameter "abap/system_clients." Thus, if all the tenants are categorized as administration tenants, the cross-tenant access is enabled for all the tenants, and accordingly, tenant isolation is switched off.

The isolation of tenants requires a tenant to be identified by a globally unique tenant identifier. The tenant identifier needs to be globally unique, rather than being unique on a system, so that tenants remain isolated and identifiable when the tenants are imported or exported from a system. The tenant identifiers are described below.

In the concept of multi-tenancy, the conventionally used ABAP client number is not a proper means to identify a tenant, as the ABAP client number cannot fulfill all aspects of tenant identifications. For example, the ABAP client number is unique only within one ABAP system. In a landscape of multiple ABAP systems, the ABAP client number is not sufficient to identify a tenant uniquely. The client number needs to be provided along with the system ID such that a combination of the system ID and the client number uniquely determines a tenant in the system landscape.

Additionally, the tenant needs to be addressable via an interne connection using a sub-domain. Hence, there is a need for a TenantID that can be used as sub-domain name and is unique within the hosting provider's domain.

The support (embedded support) process makes use of the system number (content type SLIC_SYSID) to assign tickets to a specific customer. The system number is information on system level, the information being provided and maintained in ISP and Service backbone. In a multi-client system serving for multiple customers, the system number needs to be "virtualized" such that each tenant has its own system number.

When moving or copying a tenant to another system, the client number must possibly be changed since the client number in the target system may already be occupied by another tenant. There is some security relevant information like passwords for remote connections, the passwords being encrypted and the encrypted passwords being stored in the database. When moving a tenant to a different system, the secure store content is not readable any more. Thus there is a need for a TenantID that is preserved during a tenant-move and is suitable for encryption mechanics (broad range, not easy to guess).

Therefore, to overcome the above-noted problems caused by using client numbers, the following features of TenantIDs are proposed in the instant implementation. The TenantID is a globally unique identifier (GUID), which is formed when a tenant is created technically. Thus, the TenantID is globally unique. Accordingly, when a tenant moves from a source system to a target system, the TenantID is preserved. Additionally, when a tenant is copied, a new TenantID is created for the copy.

It is to be noted that the tenantID is not used to identify tenants at database level. For example, the selection of the database partition to be accessed in an ABAP OpenSQL statement within the system, the ABAP client id of type CLNT is used. The TenantID is used in places where a more stable identifier is needed, because the ABAP client id may change in a tenant move operation and can only identify a tenant within a system at one point in time. Examples for the usage of TenantIDs are the identification of a tenant outside the system, e.g. in central systems for lifecycle management or central service systems, or the storage of encrypted security-relevant information inside and outside the system where encryption should be safe and no recalculation should be necessary.

Figure 8:
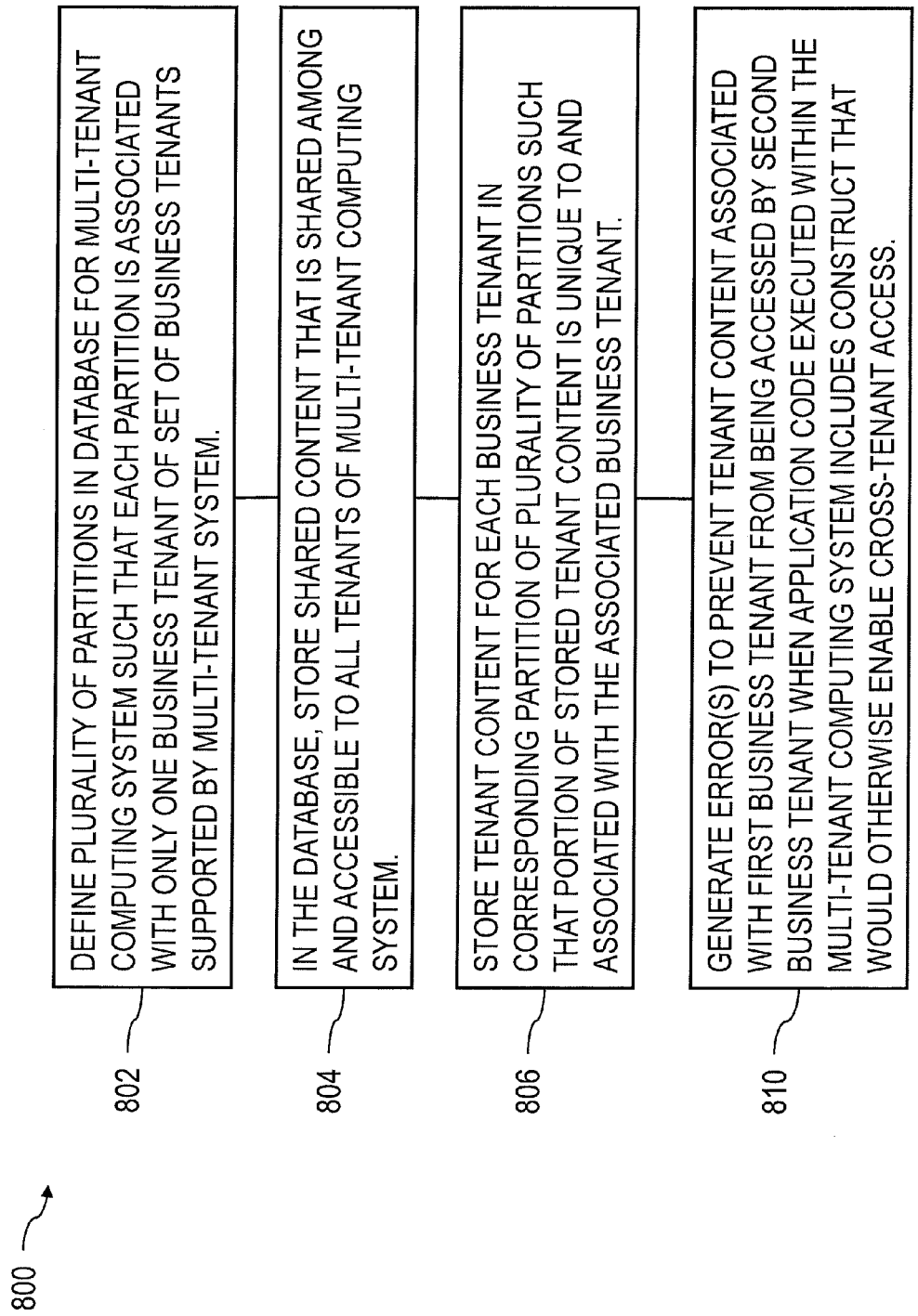
FIG. 8 is a process flow chart illustrating features of a method.

FIG. 8 shows a process flow chart 800 illustrating features that can be included in methods consistent with implementations of the current subject matter. At 802, a plurality of partitions can be defined in a database for a multi-tenant computing system provided on one or more processors. Each partition of the plurality of partitions can correspond to a single business tenant of a set of business tenants supported by the multi-tenant system. Shared content that is shared among and accessible to all tenants of the multi-tenant computing system can be stored in the database at 804. At 806, tenant content for each business tenant can be stored in the corresponding partition of the plurality of partitions of the database. At least a portion of the tenant content stored in the one partition is unique to and associated with the associated business tenant. At 810, one or more errors are generated to prevent tenant content associated with a first business tenant of the set of business tenants from being accessed by a second business tenant of the set of business tenants when an application code executed within the multi-tenant computing system comprises a construct that would otherwise enable cross-tenant access by the second business tenant to tenant content associated with the first business tenant.

The subject matter described herein can be embodied in systems, apparatus, methods, and/or articles depending on the desired configuration. In particular, various implementations of the subject matter described herein can be realized in digital electronic circuitry, integrated circuitry, specially designed application specific integrated circuits (ASICs), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. A client and server are generally, but not exclusively, remote from each other and typically interact through a communication network, although the components of the system can be interconnected by any form or medium of digital data communication. Examples of communication networks include, but are not limited to, a local area network ("LAN"), a wide area network ("WAN"), and the Internet. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer program product comprising a machine-readable medium storing instructions that, when executed by at least one programmable processor, cause the at least one programmable processor to perform operations comprising:
defining a plurality of partitions in a database for a multi-tenant computing system provided on one or more processors, each partition of the plurality of partitions corresponding to only one business tenant of a set of business tenants supported by the multi-tenant system;
storing, in the database, shared content that is shared among and accessible to all tenants of the multi-tenant computing system;
storing tenant content for each business tenant in the corresponding partition of the plurality of partitions of the database, at least a portion of the tenant content being unique to and associated with the associated business tenant; and
generating, as a result of a code check executed at run time, one or more errors to prevent tenant content associated with a first business tenant of the set of business tenants from being accessed by a second business tenant of the set of business tenants, the code check identifying application code within the multi-tenant computing system that comprises a database coding construct that fails to forbid cross-tenant access by the second business tenant to tenant content associated with the first business tenant, the code check comprising determining the existence of at least one of a CLIENT SPECIFIED addition; one or more of an IMPORT, an EXPORT, and a DELETE with a CLIENT addition; usage of Native SQL; a write access into a system field SY-MANDT; and usage of a parameter IV_CLIENT in a method attach that mediates access to one or more shared memory objects.

2. The computer program product of claim 1, wherein the second business tenant is prevented from accessing the content associated with the first business tenant at a plurality of persistency levels.

3. The computer program product of claim 1, wherein the database further stores system content that is provided by a hosting provider of the multi-tenant computing system, and wherein the method further comprises:
designating, using one or more processors of the multi-tenant computing system, a set of system tenants of the tenants of the multi-tenant computing system, each system tenant of the set of system tenants providing system services for the multi-tenant computing system using system content, and also having access to tenant content of other tenants.

4. The computer program product of claim 3, wherein:
the system content is generated by a run-time execution of an application system in the multi-tenant computing system; and
customers associated with tenants of the multi-tenant computing system and system administrator of the system are inhibited from modifying the system content.

5. The computer program product of claim 1, wherein the shared content is provided by a hosting provider of the multi-tenant computing system and is the same for all tenants of the multi-tenant computing system.

6. The computer program product of claim 5, wherein the shared content comprises kernel binaries, support packages, add-ons, data dictionary definitions, and metadata associated with an application, a same instance of which is accessible by tenants of the multi-tenant computing system.

7. The computer program product of claim 6, wherein the shared content is modifable by a system administrator, while users associated with the tenants are inhibited from modifying the shared content.

8. The computer program product of claim 1, wherein the tenant content includes business configuration data, extensions, audit data, and archived data associated with each business tenant.

9. A computer-implemented method comprising:
defining a plurality of partitions in a database for a multi-tenant computing system provided on one or more processors, each partition of the plurality of partitions corresponding to only one business tenant of a set of business tenants supported by the multi-tenant system;
storing, in the database, shared content that is shared among and accessible to all tenants of the multi-tenant computing system;
storing tenant content for each business tenant in the corresponding partition of the plurality of partitions of the database, at least a portion of the tenant content being unique to and associated with the associated business tenant; and
generating, as a result of a code check executed at run time, one or more errors to prevent tenant content associated with a first business tenant of the set of business tenants from being accessed by a second business tenant of the set of business tenants, the code check identifying application code within the multi-tenant computing system that comprises a database coding construct that fails to forbid cross-tenant access by the second business tenant to tenant content associated with the first business tenant, the code check comprising determining the existence of at least one of a CLIENT SPECIFIED addition; one or more of an IMPORT, an EXPORT, and a DELETE with a CLIENT addition; usage of Native SQL; a write access into a system field SY-MANDT; and usage of a parameter IV_CLIENT in a method attach that mediates access to one or more shared memory objects.

10. The computer implemented method of claim 9, wherein the operations further comprise:
defining, using the one or more processors, the plurality of partitions in the database, each partition of the plurality of partitions being associated with only one business tenant of the set of business tenants.

11. The computer implemented method of claim 9, wherein the second business tenant is prevented from accessing the content associated with the first business tenant at a plurality of persistency levels.

12. The computer implemented method of claim 9, wherein: the database further stores system content that is provided by a hosting provider of the multi-tenant computing system, the system content being generated by a run-time execution of an application system in the multi-tenant computing system; customers associated with tenants of the multi-tenant computing system and system administrator of the system are inhibited from modifying the system content; and the operations further comprises:
designating, using one or more processors of the multi-tenant computing system, a set of system tenants of the tenants of the multi-tenant computing system, each system tenant of the set of system tenants providing system services for the multi-tenant computing system using system content, and having access also tenant content of other tenants.

13. The computer implemented method of claim 9, wherein:
the shared content is provided by a hosting provider of the multi-tenant computing system, and is the same for all tenants of the multi-tenant computing system; and
the shared content comprises kernel binaries, support packages, add-ons, data dictionary definitions, and metadata associated with an application, a same instance of which is accessible by tenants of the multi-tenant computing system; and
an application logic of the application code is executed on the business tenants.

14. The computer implemented method of claim 9, wherein the shared content can be modified by a system administrator, while users associated with the tenants are inhibited from modifying the shared content.

15. The computer implemented method of claim 9, wherein the tenant content includes business configuration data, extensions, audit data and archived data associated with each business tenant.

16. A system comprising:
at least one programmable processor; and
a machine-readable medium storing instructions that, when executed by the at least one processor, cause the at least one programmable processor to perform operations to isolate tenant content of business tenants in a multi-tenancy landscape, the operations comprising:
defining a plurality of partitions in a database for a multi-tenant computing system provided on one or more processors, each partition of the plurality of partitions corresponding to only one business tenant of a set of business tenants supported by the multi-tenant system;
storing, in the database, shared content that is shared among and accessible to all tenants of the multi-tenant computing system;
storing tenant content for each business tenant in the corresponding partition of the plurality of partitions of the database, at least a portion of the tenant content being unique to and associated with the associated business tenant; and
generating, as a result of a code check executed at run time, one or more errors to prevent tenant content associated with a first business tenant of the set of business tenants from being accessed by a second business tenant of the set of business tenants, the code check identifying application code within the multi-tenant computing system that comprises a database coding construct that fails to forbid cross-tenant access by the second business tenant to tenant content associated with the first business tenant, the code check comprising determining the existence of at least one of a CLIENT SPECIFIED addition; one or more of an IMPORT, an EXPORT, and a DELETE with a CLIENT addition; usage of Native SQL; a write access into a system field SY-MANDT; and usage of a parameter IV_CLIENT in a method attach that mediates access to one or more shared memory objects.

17. The system of claim 16, wherein the operations further comprise:
defining, using the one or more processors, the plurality of partitions in the database, each partition of the plurality of partitions being associated with only one business tenant of the set of business tenants.

18. The system of claim 16, wherein the second business tenant is prevented from accessing the content associated with the first business tenant at a plurality of persistency levels.

19. The system of claim 16, wherein: the database further stores system content that is provided by a hosting provider of the multi-tenant computing system, the system content being generated by a run-time execution of an application system in the multi-tenant computing system; customers associated with tenants of the multi-tenant computing system and system administrator of the system are inhibited from modifying the system content; and the operations further comprise:
designating, using one or more processors of the multi-tenant computing system, a set of system tenants of the tenants of the multi-tenant computing system, each system tenant of the set of system tenants providing system services for the multi-tenant computing system using system content, and having access also tenant content of other tenants.

20. The system of claim 16, wherein:
the shared content is provided by a hosting provider of the multi-tenant computing system, and is the same for all tenants of the multi-tenant computing system; and
the shared content comprises kernel binaries, support packages, add-ons, data dictionary definitions, and metadata associated with an application, a same instance of which is accessible by tenants of the multi-tenant computing system; and
an application logic of the application code is executed on the business tenants.

* * * * *